United States Patent [19]

Liebl

[11] Patent Number: 4,806,405
[45] Date of Patent: Feb. 21, 1989

[54] METHOD AND INJECTION MOLDING TOOL FOR PRODUCING LINK BELTS

[75] Inventor: Rudolf Liebl, Altstaetten, Switzerland

[73] Assignee: EgoKiefer AG, Altstaetten, Switzerland

[21] Appl. No.: 936,821

[22] Filed: Dec. 2, 1986

[30] Foreign Application Priority Data

Dec. 5, 1985 [CH] Switzerland ............... 5185/85

[51] Int. Cl.⁴ ........................................... B29C 33/42
[52] U.S. Cl. ........................... 428/52; 428/54;
428/131; 264/251; 264/328.8; 264/328.12;
425/117; 425/122; 425/233
[58] Field of Search ............ 264/251, 252, 229, 275,
264/297.88, 328.8, 328.12; 425/DIG. 34, 814,
233, 121, 122, 129 R, 110, 116, 117, 127, 237;
428/52, 54, 131

[56] References Cited

U.S. PATENT DOCUMENTS

| | | | |
|---|---|---|---|
| 2,920,354 | 1/1960 | Zumbrunnen | 264/251 |
| 4,152,798 | 5/1979 | Akaura et al. | 264/251 |
| 4,176,149 | 11/1979 | Moertez | 264/251 |
| 4,636,347 | 1/1987 | Kato | 264/251 |

FOREIGN PATENT DOCUMENTS

| | | | |
|---|---|---|---|
| 261113 | 10/1911 | Fed. Rep. of Germany | 264/251 |
| 228767 | 12/1943 | Switzerland | 264/251 |

Primary Examiner—Benoit Castel
Assistant Examiner—Richard D. Jordan
Attorney, Agent, or Firm—W. G. Fasse; D. H. Kane, Jr.

[57] ABSTRACT

A link chain or string is produced in an injection molding tool in such a way that a plurality of links threaded onto a string or cable are molded simultaneously, for example in the form of spheres. In order to avoid the transmission of axial forces to the links, which forces might disturb the axial spacings from link to link, the injection molding tool is provided with restrictions which reduce the cross-sectional area of molten material flow channels to a minimum. Preferably, the restricted area is located directly at the respective link. The channels all lead to a common injection molding channel to which the molten material is supplied for thus simultaneously casting or molding of a plurality of links to strings or cables. The restrictions make sure that any forces resulting from shrinkage during the cooling and solidifying cannot shift the balls or links even if the latter are not yet completely solidified internally. Thus, errors in the on-center spacing between adjacent links are avoided.

9 Claims, 2 Drawing Sheets

METHOD AND INJECTION MOLDING TOOL FOR PRODUCING LINK BELTS

FIELD OF THE INVENTION

The invention relates to a method and to an injection molding tool for producing link belts or chains to which links of synthetic material are secured. The term "link belts" is used in its broadest meaning to include a flexible string or a cable to which synthetic chain links are secured at spaced intervals, whereby these links are injection molded onto a string or cable or belt or the like.

DESCRIPTION OF THE PRIOR ART

Ball or link chains are known, comprising a flexible string on which balls are threaded or lined up at uniform spacings. Such ball or link chains or simply ball chains have a wide range of use, particularly because the ball chains can be bent or turned in any desired direction, whereby they may serve in many instances for a synchroneous drive or control, or they may serve as force transmitting elements. Originally such ball chains were made of metal. However, balls made of synthetic materials have also become known. Ball chains with balls of synthetic material have been produced heretofore in such a way that the balls were individually injection molded onto a string or cable, whereupon the string or cable was transported by a feed advance in accordance with a predetermined on-center spacing between two neighboring balls. Such a production method is very slow and not suitable for mass production.

The simultaneous production of a plurality of balls injection molded onto a string or cable in an injection mold for synthetic material has failed heretofore due to the fact that spacing errors occurred due to heat shrinkage. Such spacing errors are unacceptable in connection with the use of such ball chains for the synchroneous drive or for control purposes. It has been found that connecting lands leading to the individual balls due to the injection molding and which lands extend from a common injection molding land, cause, due to any heat shrinking during cooling, a slight displacement of the balls along the string or cable because the inside of the balls has not yet fully cooled. Such displacement of the balls results in spacing inaccuracies in the finished ball chain. The larger the number of balls which were injection molded simultaneously, the larger became the inaccuracy. The spacing errors became the larger the further the balls were removed from the center of the injection molding land.

OBJECTS OF THE INVENTION

In view of the foregoing it is the aim of the invention to achieve the following objects singly or in combination:

to provide a method for the mass production of link belts or link chains also referred to as ball chains, comprising a plurality of links made of synthetic material, wherein the links may be balls, and whereby the mentioned spacing error is avoided;

to provide a method and apparatus in which the type of link belt or chain as described above can be produced in a multiple injection mold in an efficient and economic manner; and to produce such belt or chains with link elements having any desired shape not just spheres.

SUMMARY OF THE INVENTION

According to the invention the method is characterized in that there is provided at least one common longitudinal injection molding land extending in parallel to the string or cable for the simultaneous injection molding of a plurality of links onto said string or cable. The method further comprises providing connecting lands or passages extending laterally away from the common longitudinal passage toward the individual links, whereby the connecting paths or lands are made so weak and/or the cross-section thereof at least at one location, is made so small that a force transmission, after the injection molding has been completed, is prevented and thus a displacement of the links along the string or cable due to heat shrinkage of the common injection molding land or path is avoided.

Due to the provision of the thin wall or weak connection between the injection molded links, especially balls, and the respective connecting lands, the relatively massive common injection molding land cannot exert any displacement force on the links or balls in the longitudinal direction of the string or cable. This holds true even though the relatively massive common injection molding land is subject to material shrinkage when the molten material solidifies.

The material shrinkage is unavoidable in connection with synthetic materials. Such shrinkage is relatively large compared to the shrinkage of metals, in the longitudinal direction of the common injection molding land. Yet, as a result of the present teaching the shrinkage of the common injection molding land can only cause a slight bending of the relatively thin lands and/or of the relatively weak restriction just in front of the link or ball. When the links or balls just after the injection molding operation have not yet completely cooled down on the inside due to their mass, these links or balls do not yet rigidly enclose, nor do they solidly adhere to the string or cable. However, the weak connecting location prevents that a change in the position of the links or balls in the longitudinal direction of the string or cable can take place.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
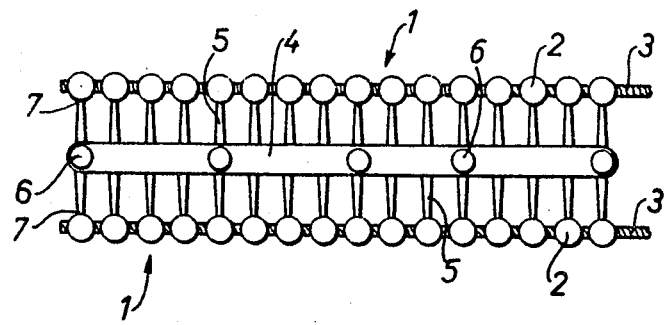
FIG. 1 is a top plan view of two ball chains which are connected to a common injection molding land through individual connecting lands which must later be removed.

FIG. 1 shows an injection molded part 1 made of synthetic material including two ball chains manufactured simultaneously. Two partial lengths of such chains are shown. As a result of the injection molding the chains still are interconnected by lands 5 leading from each ball 2 to a common injection molding land 4. Due to the injection molding the balls 2 are permanently bonded to the strings or cables 3. After the injection molding and after the cooling the lands 5 are separated from the balls 2 at the point 7 which designates the narrowest cross-section of the lands 5. Thus, the lands 5 and the common injection molding land 4 are separated from both ball chains and are removed as waste while the two chains remain as the result of the injection molding. Due to the reduced cross-sections 7 any forces in the axial direction resulting from the shrinkage especially of the land 4, cannot be transmitted to the balls 2 so that these balls remain uniformly spaced along their respective string or cable 3. The balls or similar elements are rigidly secured to the respective string or cable 3 as a result of the solidification and curing of the synthetic material.

FIG. 1 shows two strings 3 each carrying sixteen spheres 2. However more than two strings 3 may be stepped through the injection mold and the number of balls produced along each string section in each injection molding step may also be substantially larger, for example, forty to fifty balls have been found to be easily made simultaneously along each section of string or cable 3. The feed advance of the strings or cable 3 in steps through the injection molding tool is not part of the invention. After the initial insertion of the required number of strings or cables into the injection mold, the feed advance may continue until the entire length of the cable or string has been used up. Thus, the total length of a link chain or belt according to the invention is practically determined only by the total length of the available string or cable 3.

Figure 3:
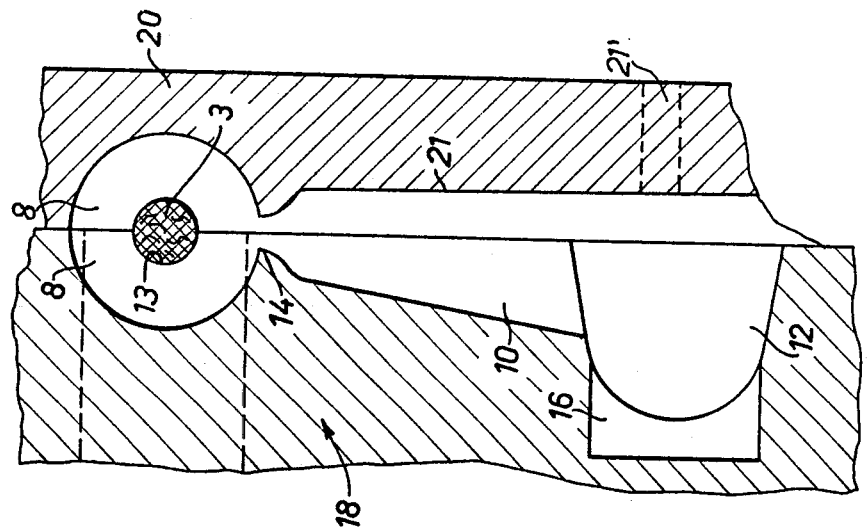
FIG. 3 is a sectional view along section line III—III in FIG. 2.
Figure 2:
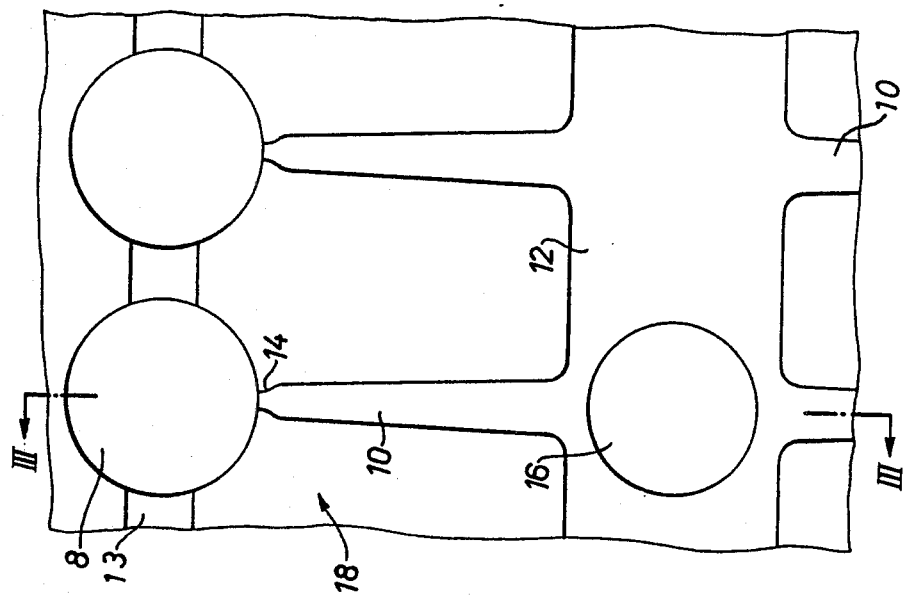
FIG. 2 is a top plan view onto a portion of a mold plate of the injection molding tool.

As shown in FIGS. 2 and 3 the multiple injection mold comprises two mold plates 18 and 20 having recesses therein corresponding to the mold cavities and to the passageways for supplying the molten material into the mold cavities. A hollow space or channel 12 serves for the introduction of the molten material into the mold. The channel 12 extends in parallel to a groove 13 which is intended to receive the string or cable 3. The above mentioned land 4 is formed in the channel 12. Recesses 16, for example, of cylindrical shape, are formed at spaced intervals in the mold plate 18 along the channel 12 for forming studs 6 also shown in FIG. 1. These studs 6 also help reducing the effects of any shrinkage when the injected material is cooling because the studs 6 tie the lands 4 to the mold plate 18.

Semispherical recesses 8 are provided in each mold plate 18 and 20. Side channels 10 in the mold plate 18 connect the molten material main supply channel 12 to the recesses or cavities 8 in the mold plates 18 and 20. These side channels 10 result in the formation of the connecting lands 5 having relatively thin walls. The side channels 10 are so shaped that the cross-sections of these lands 5 decrease, as the spacing from the injection molding land 5 increases. Directly where the side channels 10 enter into the ball shaped recesses or cavities 8, each side channel 10 is provided with a throat 14 of substantially reduced cross-section, whereby the resulting land 5 has its smallest cross-section at this point for limiting or eliminating an effect of any axial forces resulting from the solidification and cooling of the synthetic material, on the balls or links 2. The axial direction in this connection is the longitudinal direction of the strings or cables 3. These reduced cross-sectional areas of the connecting lands 5 which are caused, according to the invention, by the restrictions or throats 14, thus make sure that a longitudinal displacement of the balls 2 is prevented as long as is necessary, namely until the balls 2 are completely solidified. Thus, the balls will not shift, even after they have been removed from the mold, although they have not yet completely solidified on the inside.

In a practical example embodiment the cross-sectional dimension of the restriction or throat 14 is less than 10% of the respective dimension of the balls 2. For example, the throat cross-sectional area is within the range of 0.1 to 0.2 mm$^2$, but maximally it may be about 1 mm$^2$. The cross-sectional area of these restrictions 14 is less than 1 mm$^2$. Where the ball diameter is 4.5 mm, the cross-section of the restriction 14 is about 1/6 of 1 mm$^2$. The cross-section of the injection molding land 4 is substantially larger than the cross-section of the individual connecting lands 5 where these lands 5 merge into the land 4, for example, the cross-sectional area of the land 4 may be three times the cross-sectional area of the land 5 at the location where the lands 5 join the land 4. As shown in FIGS. 2 and 3, the cross-sectional size of the central main channel 12 is larger than the cross-sectional size of the side or branch channels 10.

The second or upper mold plate 20 which closes the mold has recesses compatible or similar to the recesses in the mold plate 18, except that the side channels 10 and the injection molding channel 12 have a flat, narrow side 21. Additionally, the mold plate 20 has at least one inlet channel 21' for introducing the molten material into the mold channel 12. The molten material is, for example, polyamide, polyester or the like, synthetic material.

The string or cable 3 passes centrally through each ball. The string is preferably made also of synthetic fibers such as polyamide, polyester, polypropylene fibers, or the like. For special purposes, the string or cable 3 may be made of a steel wire or wires encased by the mentioned synthetic materials or a steel cable may be used which is not encased.

Figure 4:
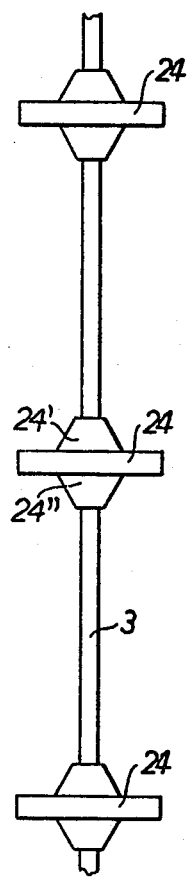
FIG. 4 illustrates one example embodiment of molded links having the shape of disks with conical projections in the direction of the string or cable.
Figure 5:
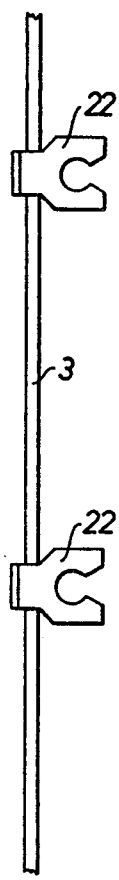
FIG. 5 is another example embodiment in which the links are formed as fork-type elements.
Figure 6:
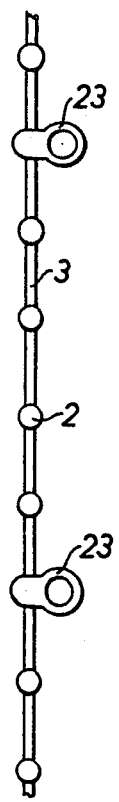
FIG. 6 shows still another example embodiment in which the links comprise groups of balls spaced by links in the form of eyelets.

As shown in FIGS. 4, 5, and 6, the elements 2 need not be balls. These elements may have almost any desired shape as illustrated in FIGS. 4, 5, and 6. In FIG. 4 the elements have a central disk 24 flanked by two truncated conical sections 24' and 24''. In FIG. 5 the elements have a fork-type configuration 22. In FIG. 6 groups of balls 2 alternate with eyelet elements 23.

As mentioned above, the production efficiency and economy is improved by holding simultaneously more than two strings, for example, four or six string sections may be molded with links in a respectively formed mold. Further, the length shown in FIG. 1 is merely an example and the above mentioned number of links for each mold section is quite practical.

Although the invention has been described with reference to specific example embodiments, it will be appreciated, that it is intended to cover all modifications and equivalents within the scope of the appended claims.

What I claim is:

1. A method for simultaneously injection molding two link chains, each link chain having an elongated flexible member and a series of synthetic material link elements having a given cross-sectional dimension and being molded at equal spacings from one another to their respective elongated flexible member, comprising the following steps:
   (a) using an injection mold having two rows of mold cavities, each row including a series of equally spaced cavities for simultaneously forming said series of link elements on each link chain as a row along each link chain, grooves for said elongated flexible member interconnecting said cavities to form said two rows of cavities, and molten material supply channels including a main channel located between said two rows of cavities and individual branching channels leading individually from said main channel to each cavity in both rows,
   (b) providing each individual branching channel with a throat of reduced cross-sectional dimension corresponding to less than about 10% of said given cross-sectional dimension of said link elements,
   (c) locating said reduced throat directly at the respective link forming cavity,
   (d) inserting one elongated flexible member into each row of cavities and grooves and closing the mold,
   (e) introducing molten material into said cavities through said main channel and said individual channels, and
   (f) restricting a cross-sectional dimension of a land, formed in said individual channel by said throat of reduced cross-sectional dimension, to such an extent that forces components resulting from material shrinking during the cooling of the synthetic material in said main channel, are substantially prevented from displacing said link elements along the respective elongated flexible member, whereby said equal spacings between neighboring link elements are assured even if the chain is removed from the mold before complete solidification of said link elements.

2. The method of claim 1, further comprising dimensioning said throats in said branching channels so that said reduced cross-sectional dimension is within the range of about 0.1 to 1 mm², using for said elongated flexible members strings made of at least partly of synthetic material, shaping said cavities as hemispheres to form said link elements as spheres having a diameter of about 4.5 mm, removing both chains from said mold after sufficient solidification of said initial molten material, and severing said spheres from waste at said throat.

3. A link chain or link belt manufactured according to claim 1.

4. An injection mold for simultaneously injection molding two link chains, each link chain having an elongated flexible member and a series of synthetic material link elements molded at equal spacing from one another to their respective elongated flexible member to simultaneously form one row of link elements along each respective elongated flexible member, comprising a lower mold plate, an upper mold plate, two rows of equally spaced cavities in each row in said mold plates for simultaneously forming said link elements as two rows of a series of link elemens, said cavities having cross-sectional dimensions corresponding to respective dimensions of said link elements, grooves for insertion of said elongated flexible member, said grooves interconnecting said cavities in each row, molten material supply channel means in said mold plates, said channel means including a central main channel between said rows and having at least one molten material supply inlet connected to said central main channel, said central main channel and said two rows of grooves including said cavities extending substantially in parallel to each other and in the longitudinal direction of said two link chains, and individual channels leading away from said central main channel in opposite directions to each of said cavities in each row, so that said individual channels and said central main channel form two ladder type individual channel configurations for producing said two link chains, each individual channel having a throat with a reduced cross-sectional flow area corresponding to less than about 10% of said cross-sectional dimension of said cavities for forming said link elements of said molten material, said reduced cross-sectional flow area of each throat preventing shrinking forces from distorting said equal spacings.

5. The injection mold of claim 4, wherein said throat having a reduced cross-sectional flow area is located directly at the entrance of each of said individual channels to said cavities.

6. The injection mold of claim 4, wherein said throat cross-sectional flow area is within the range of about 0.1 to 0.2 mm².

7. The injection mold of claim 4, wherein said throat cross-sectional flow area is maximally 1 mm².

8. An injection mold for simultaneously injection molding a series of synthetic material ball elements of a ball chain or belt, onto an elongated flexible member for securing said ball elements to said elongated flexible member at predetermined equal spacings from one another, comprising a lower mold plate, an upper mold plate, two rows of hemispherical mold cavities in each of said mold plates for simultaneously forming two series of said ball elements grooves, for insertion of an elongated flexible member into each of said rows, said grooves interconnecting said hemispherical mold cavities to form said rows, molten material supply channel means in said mold plates, said channel means including a central main channel extending between and substantially in parallel to the longitudinal direction of said two rows of hemispherical mold cavities, and individual branch channels leading away from said central main channel to each of said hemispherical mold cavities, said individual branch channels extending substantially perpendicularly away from said main central channel in oppositè directions to form at least two ladder type individual channel configurations for producing at least two ball chains simultaneously, said central main channel having a cross-section larger than a cross-section of said inidvidual branch channels, each individual branch channel having a throat with a reduced cross-sectional flow area for said molten material for molding a restricted cross-sectional dimension into each land formed as waste in said individual branch channels, said throat being located directly at an entrance of said individual branch channels into a middle part of the respective hemispherical cavity, said reduced cross-sectional flow area of said throat being within the range of about 0.1 mm² to about 1.0 mm² for preventing shrinking forces from distorting said equal spacings.

9. The injection mold of claim 8, wherein said central main channel comprises a plurality of cylindrical recesses (16) spaced relative to each other along said central, main channel, at least one molten material inlet channel (21') leading through one of said mold plates into said central main channel at one side thereof, said cylindrical recesses (16) being located on the opposite side of said central main channel.

* * * * *